United States Patent [19]

Orenski

[11] 3,940,427

[45] Feb. 24, 1976

[54] AZIDOSULFONYL COMPOUNDS

[75] Inventor: Peter Joseph Orenski, Ossining, N.Y.

[73] Assignee: Union Carbide Corporation, New York, N.Y.

[22] Filed: June 26, 1974

[21] Appl. No.: 483,376

[52] U.S. Cl. .................. 260/349; 152/300; 106/52
[51] Int. Cl.² ........................................ C07C 117/00
[58] Field of Search ..................................... 260/349

[56] References Cited

UNITED STATES PATENTS 3,706,592   12/1972   Thomson ............................ 260/349

Primary Examiner—Elbert L. Roberts
Attorney, Agent, or Firm—Reynold J. Finnegan

[57] ABSTRACT

Diazidosulfonyl-containing aromatic carboxylic acids useful as blowing agents, cross-linkers, adhesion promoters and in the production of azido-silane coupling agents.

3 Claims, No Drawings

AZIDOSULFONYL COMPOUNDS

BACKGROUND OF THE INVENTION

This invention relates to novel azidosulfonyl-containing aromatic compounds and more particularly to novel diazidosulfonyl-containing aromatic carboxylic acids.

While the prior art e.g. U.S. Pat. Nos. 3,507,829, 3,705,911 and 3,706,592 have disclosed certain mono- and diazidosulfonyl-containing aromatic compounds, it has been silent with regard to diazidosulfonyl-containing aromatic carboxylic acids.

SUMMARY OF THE INVENTION

Thus it is an object of this invention to provide diazidosulfonyl-containing aromatic carboxylic acids. Other objects and advantages of this invention will become readily apparent from the following description and claims.

The novel diazidosulfonyl-containing aromatic carboxylic acids of this invention are those having the general formula:

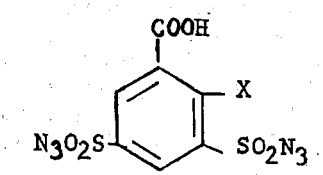

wherein X is a radical selected from the group consisting of hydrogen and a hydroxy radical. Thus when X is hydrogen the novel carboxylic acid of this invention is 3,5-di(azidosulfonyl) benzoic acid and when X is a hydroxy radical the novel carboxylic acid of this invention is 3,5-di(azidosulfonyl) salicylic acid.

DESCRIPTION OF THE PREFERRED EMBODIMENTS

The diazidosulfonyl-containing aromatic carboxylic acid compounds of the instant invention can be prepared by reacting the corresponding 3,5-disulfonyl chloride containing aromatic acid with sodium azide in an appropriate solvent medium and allowing the reaction to proceed until the desired product is obtained. A convenient method generally employed is to dissolve the 3,5-disulfonyl chloride containing aromatic carboxylic acid in acetone and the sodium azide in water and mix the two solutions. Since the reaction is highly exothermic it is preferred that the reaction temperature be maintained at 0°–5°C. The reaction is preferably conducted at atmospheric pressure and the optimum reaction time will of course depend on obvious processing factors. Normally the reaction time will be less than one hour. It is also generally preferred to employ at least two moles of azide reactant for every mole of carboxylic acid reactant use. The desired 3,5-diazidosulfonyl-containing aromatic carboxylic acid products are solids and can easily be recovered by any well known conventional recovery technique. For example 3,5-di(azidosulfonyl) benzoic acid can be recovered by adding the reaction mixture to ice water, extracting the product containing solution with ether, drying the extract and vacuum stripping the ether from the solid product. The 3,5-(diazidosulfonyl) salicylic acid can be recovered by filtrating it from the reaction mixture, drying the filtrate and vacuum stripping any residual acetone off. If desired the solid filtrate can then be crystallized in benzene and the resultant crystallined product in benzene, filtered and vacuum dried.

The diazidosulfonyl-containing aromatic carboxylic acids of this invention have a wide range of utility, e.g., they may be employed as blowing agents in the production of thermoplastic foam articles, as cross-linking agents for organic polymers, and to promote adhesion of polyester tire cord to rubber tire shock. Moreover, they can also be used to produce novel azido-silane compositions of matter which are useful as coupling agents to promote improved bonding between inorganic substrates, such as siliceous, metallic and metallic oxide materials and organic polymers, e.g., as size binders in the glass finishing industry, as seen more fully disclosed in concurrently filed U.S. Applications, Ser. Nos. 483,365 and 483,367.

The following examples are illustrative of the present invention and are not to be regarded as limitative. It is to be understood that all parts, percentages and proportions referred to herein and in the appended claims are by weight unless otherwise indicated.

EXAMPLE 1

8.0 grams (123 milimoles) of sodium azide dissolved in 25 ml. of water were added to 16 grams (50 milimoles) of 3,5-di(chlorosulfonyl) benzoic acid (melting point 181°–183°C.) dissolved in 80 ml. of acetone. The addition was conducted at 2°–5°C. over ten minutes and then the reaction mixture stirred for one-half hour while maintaining the reaction temperature at 2°–5°C. before being added to 500 ml. of ice water. The cloudy solution was extracted with two 250 ml. portions of ethyl ether. The ether extracts were then combined and dried over anhydrous magnesium sulfate and the ether stripped under a vacuum. There was obtained 9.0 grams (a 54 percent yield) of the desired 3,5-di(azidosulfonyl) benzoic acid product which was a yellowish solid having a melting point of 118°–121°C. Infrared and nuclear magnetic resonance analysis verified the product to be 3,5-di(azidosulfonyl) benzoic acid,

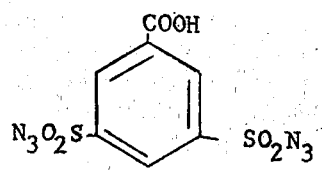

EXAMPLE 2

14.3 grams (0.22 mole) of sodium azide dissolved in 40 ml. of water were added to 33.5 grams (0.1 mole) of 3,5-di(chlorosulfonyl) salicyclic acid (melting point 184°–186°C.) dissolved in 150 ml. of acetone. The addition was conducted at 0° to 5°C. over five minutes and then the reaction mixture stirred for one-half hour at 0° to 5°C. The solution was filtered and the upper (acetone) layer of the filtrate separated and dried over anhydrous magnesium sulfate. The acetone was then stripped under vacuum and replaced with 200 ml. of benzene to give a cloudy solution containing some solids. The solution was filtered and the volume of filtrate reduced to 80 ml. by evaporation and allowed to crystallize. There was obtained 29.5 grams (an 85% yield) of crystalline 3,5-di(azidosulfonyl)salicylic acid by filtration and drying of the crystals under a vacuum at 65°C. The desired product obtained decomposed in a capillary tube starting at 165°C. without melting and became a dark brown mass at 210°C. Infrared and nuclear magnetic resonance analysis verified the product to be 3,5-di(azidosulfonyl)salicylic acid,

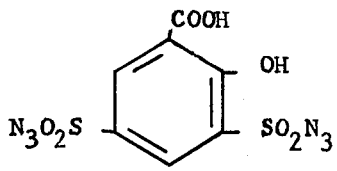

EXAMPLE 3

A clear stable 2 wt. % acetone azido-silane product solution was formed by dissolving 3.1 grams of gamma-aminopropyltriethoxysilane in 147 grams of acetone at room temperature and then added 4.9 grams of 3,5-di(azidosulfonyl) salicylic acid with vigorous stirring.

The 2 wt. % aqueous azido-silane product solution was then used to finish 4 thirteen inch wide swatches of heat-cleaned glass fabric. At 50 wt. % pickup, 1 wt. % solids based on fabric weight was deposited on the glass surface. All the swatches were then air dried for four hours and used to prepare a dry sandwich laminate by alternating eleven plies of finished glass fabric and twelve plies of 0.010 inch polypropylene film. The laminate was then pressed to stops in a pre-heated press for 30 minutes at 475°F. The pressed laminate was cut in ½ × 4 inch test specimens with the 4 inch dimension parallel to the fabric warp direction and tested for flexural strength, both initially and after immersion in water, according to ASTM Specification D-790 using a Baldwin-Tate Tester.

The test specimens showed a flexural strength of 24,700 psi. By comparison a polypropylene-glass laminate prepared from unfinished heat-cleaned glass fabric had a flexural strength of 12,700 psi; a polypropylene-glass laminate prepared from gamma-aminopropyltriethoxysilane finished glass fabric had a flexural strength of 21,800 psi and a polypropylene-glass laminate prepared from gamma-methacryloxypropyltrimethoxysilane finished glass fabric had a flexural strength of 17,900 psi.

EXAMPLE 4

An ethanolic azido-silane product solution was prepared by dissolving 4 grams of gamma-aminopropyltriethoxysilane in 150 ml. of 190 proof ethanol at room temperature followed by the addition of 6 grams of 3,5-di(azidosulfonyl) benzoic acid with vigorous stirring. The clear stable azido-silane product solution was used to coat Wollastonite filler in a twin-shell blender equipped with an intensifier. The treated filler was then dried for two hours at 100°C. 2.2 pounds of the treated Wollastonite were mixed with polypropylene resin and the mixture (50 wt. % Wollastonite and 50 wt. % polypropylene) was injection molded at 480°F. (mold temperature 120°F., injection pressure 15,000 psi.) using a three ounce Van Dorn injection molder to yield test specimens of Wollastonite-filled polypropylene.

The test specimens showed a flexural strength of 9,900 psi. and a tensile strength of 5,200 psi. By comparison test specimens prepared from untreated Wollastonite and polypropylene showed a flexural strength of 6,500 psi and a tensile strength of 3,200 psi. and test specimens prepared from gamma-aminopropyltriethoxysilane treated Wollastonite and polypropylene showed a flexural strength of 3,500 psi.

Various modifications and variations of this invention will be obvious to a worker skilled in the art and it is to be understood that such modifications and variations are to be included within the purview of this application and the spirit and scope of the appended claims.

What is claimed is:

1. A diazidosulfonyl-containing aromatic carboxylic acid having the formula:

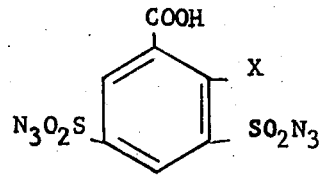

wherein X is selected from the group consisting of hydrogen and a hydroxyl radical.

2. A diazidosulfonyl-containing aromatic carboxylic acid as defined in claim 1, wherein X is hydrogen.

3. A diazidosulfonyl-containing aromatic carboxylic acid as defined in claim 1, wherein X is a hydroxyl radical.

* * * * *

UNITED STATES PATENT OFFICE
CERTIFICATE OF CORRECTION

Patent No. 3,940,427　　　　　　　　　Dated February 24, 1976

Inventor(s)　P. J. Orenski

It is certified that error appears in the above-identified patent and that said Letters Patent are hereby corrected as shown below:

Col. 2, line 10, "shock" should be ---stock---.

Signed and Sealed this

Fourteenth Day of September 1976

[SEAL]

Attest:

RUTH C. MASON
Attesting Officer

C. MARSHALL DANN
Commissioner of Patents and Trademarks